ns
3,352,846
MONOAZO PYRIMIDINE DYES
Gerhard Luetzel, Ludwigshafen (Rhine), Germany, assignor to Badische Anilin- & Soda-Fabrik Aktiengesellschaft, Ludwigshafen (Rhine), Germany
No Drawing. Filed Apr. 13, 1965, Ser. No. 447,893
Claims priority, application Germany, Apr. 21, 1964,
B 76,438
3 Claims. (Cl. 260—154)

The present invention relates to new yellow azo dyes having the general formula:

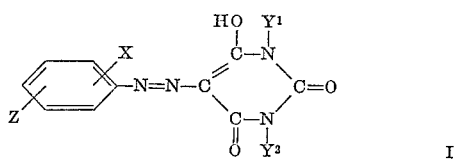

in which X denotes a halogen atom or an alkoxy radical, preferably of low molecular weight, $Y^1$ denotes a hydrogen atom or an alkyl radical, preferably of low molecular weight, $Y^2$ denotes a hydrogen atom or an alkyl radical, preferably of low molecular weight, and Z denotes an unsubstituted or substituted sulfonamide group which is situated in 3-, 4-, 5- or 6-position to the azo group and which contains at least one reactive hydrogen atom, and to a process for the production of these dyes.

The new dyes may be obtained by diazotizing an amine having the general formula:

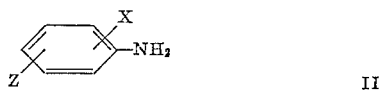

and coupling the diazonium compound with a pyrimidine having the general formula:

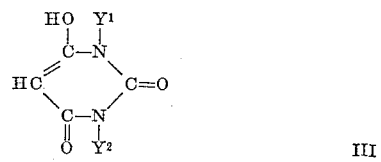

$X$, $Y^1$, $Y^2$ and $Z$ in Formulae II and III having the meanings given above.

Amines having the general Formula II bear an unsubstituted or substituted sulfonamide containing at least one reactive hydrogen atom in 3-, 4-, 5- or 6-position. The term "reactive hydrogen atom" defines a hydrogen atom which enables the dye to react as a nucleophilic component in addition or substitution reactions, such as the Michael addition. Examples of such hydrogen atoms are the two hydrogen atoms of an unsubstituted sulfonamide group or the remaining hydrogen of a monosubstituted sulfonamide group. Hydrogen atoms on nitrogen or oxygen atoms in amide substituents, such as $$H_2N-CH_2-CH_2-$$

$HO-CH_2-CH_2-$ or $H_2N-NH-$ radicals, may also be termed reactive hydrogen atoms. Thus, sulfonamide groups are also suitable in which both hydrogen atoms are substituted provided at least one substituent contains a reactive hydrogen atom of the said type. The sulfonamide group may bear as substituents aliphatic, aromatic or heterocyclic radicals which in turn may bear substituents, such as halogen atoms, amino, hydroxyl, thiomorpholinedioxide or cyano groups. Examples of sulfonamide groups which may be used are: $-SO_2-NH_2$, $-SO_2-NH-CH_2-CH_2-OH$ $-SO_2-NH-CH_2-CH_2-Cl$

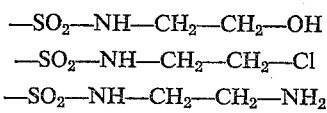

$-SO_2-NH-CH_2-CH_2-NH_2$ $-SO_2-NH-CH_2-CH_2-CN$ $-SO_2-NH-CH_2-CH_2-SO_3H$ $-SO_2-NH-CH_2-CH_2-COOH$

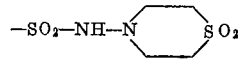

$-SO_2-NH-CH_3$ and

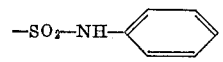

The said amines contain in 2-position a halogen atom or an alkoxy radical, preferably one of low molecular weight, such as an alkoxy radical having one to three carbon atoms. Examples of amines having the general Formula II are the following compounds:

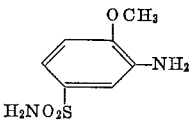

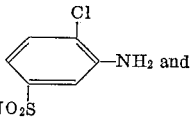

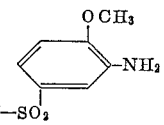

The process for the production of the new dyes is carried out by diazotizing the said amines by a conventional method and coupling the product with pyrimidines having the general Formula III. Examples of pyrimidines having the general Formula III are barbituric acid, mono-N-methylbarbituric acid and N,N'-dimethylbarbituric acid.

The new dyes are suitable for dyeing or printing textile material, such as textile material of polyacrylonitrile, copolymers of acrylonitrile with other vinyl compounds, or natural or synthetic polyamides. They are however particularly suitable for dyeing or printing fibrous material containing hydroxyl groups, such as cellulose fibers, if the dyes are used in the presence of crosslinking polyfunctional compounds, for example by the method according to German printed application No. 1,155,088. Dyeings are obtained which are distinguished by brilliance and excellent general fastness properties. A great advantage of the new yellow dyes is that they make possible the production of brilliant green dyeings with this type of application.

Although the yellow dyes (cf. Textilpraxis 1963, p. 767) used for dyeing or printing fibrous material containing hydroxyl groups by the method known from German printed application No. 1,155,088, in some cases exhibit outstanding fastness properties, when mixed with blue dyes they give green dyeings which do not have entirely satisfactory fastness to daylight or to exposure to light while wet. It is surprising that the new yellow dyes having the general formula I, when they have been mixed with a blue dye, for example a reactive dye or a copper phthalocyanine dye or anthraquinone dye capable of crosslinking with cellulose via reactive hydrogen atoms, give brilliant green dyeings having outstanding fastness to daylight and to wet exposure to light.

Dyes having the Formula I in which the sulfonamide group is in 3-position are particularly suitable for the production of light-fast green mixtures.

The invention is further illustrated by the following examples. The parts and percentages specified in the examples are by weight.

*Example 1*

24.4 parts of 2-acetaminoanisol-4-sulfamide is heated with 100 parts of water and 30 parts of concentrated hydrochloric acid for two hours at 105° C. under reflux.

The whole is cooled slowly and 30 parts of an aqueous 23% solution of sodium nitrite is dripped in at 0° to 5° C. The whole is stirred for another hour and the solution is slowly added with good stirring to a suspension of 12.8 parts of barbituric acid in 500 to 1000 parts of water at 10° C. The whole is then stirred for several hours, the pH value is adjusted to 5 to 6 and the dye formed is suction filtered. A bright yellow dye having the formula:

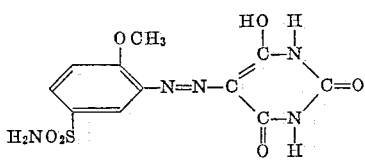

is obtained in a good yield.

Example 2

The solution of diazotized 2-aminoanisol-4-sulfamide obtained according to Example 1 is allowed to flow slowly into a solution of 14.1 parts of mono-N-methylbarbituric acid in 500 parts of water. The temperature is held between 0° and 10° C. by adding ice. The mixture is stirred for several hours, suction filtered and the product washed with water. A bright green dye having the formula:

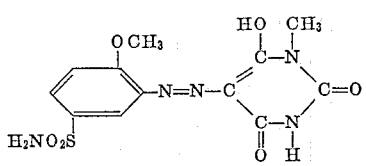

is obtained in a good yield.

By using 15.5 parts of N,N'-dimethylbarbituric acid instead of 14.1 parts of mono-N-methylbarbituric acid and otherwise following the above procedure, a similar yellow dye is obtained.

By using a solution obtained by diazotization of 20.7 parts of 1-amino-2-chloro-5-sulfonamidobenzene instead of a solution of diazotized 2-aminoanisol-4-sulfamide and otherwise following the procedure described in the first example or in this example, similar yellow dyes are obtained.

Example 3

10 parts of the dye described in Example 1, 10 parts of the dye obtainable by reaction of copper phthalocyanine trisulfonyl chloride with ammonia and containing one $HO_3S-$ group and two $H_2NO_2S-$ groups, 15 parts of sodium bicarbonate, 100 parts of urea and 345 parts of water are heated. There are then stirred in 20 parts of 1,3,5-triacryloylhexahydro-s-triazine immediately followed by 400 parts of a sodium alginate thickening which contains about 40 parts of dry substance in 1000 parts.

Cotton cloth is printed with this print paste. The printed cloth is dried, steamed for about three to eight minutes, rinsed and soaped at the boil. Brilliant green prints having outstanding fastness, particularly to exposure to light when wet and to daylight are obtained.

If 10 parts of the dye having the formula:

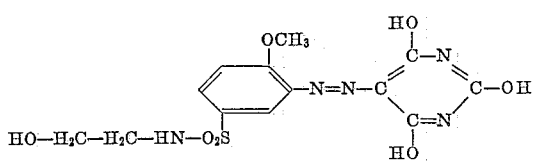

be used instead of 10 parts of the dye described in Example 1, similar green prints are obtained.

By using polyacrylonitrile cloth instead of cotton cloth, similar green prints are obtained.

Example 4

264 parts of 1-methoxy-2-acetylaminobenzene-4-sulfochloride is dissolved in 1000 parts of acetone and this solution is added while stirring and cooling to 20° to 30° C. to 1100 parts of a 17% aqueous taurine solution which has previously been adjusted to pH 9 with concentrated hydrochloric acid. A pH of 6 to 8 is maintained in the reaction solution by adding aqueous sodium carbonate solution. The precipitate which is soon formed is suction filtered after the reaction is over, recrystallized from dilute alcohol and dried. 35.2 parts of this reaction product is further reacted as described in Example 1. A bright yellow dye having the formula:

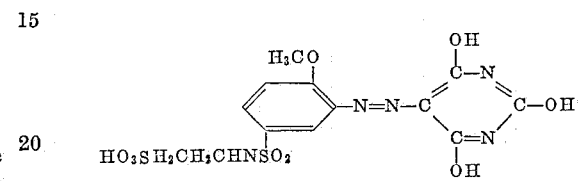

is obtained in a good yield.

Example 5

264 parts of 1-methoxy-2-acetylaminobenzene-4-sulfonyl chloride is dissolved in 1000 parts of acetone and this solution is added, while stirring and cooling to 20° to 30° C. to 500 parts of an aqueous solution of 17 parts of ammonia and 75 parts of aminoacetic acid which has previously been adjusted to pH 7 to 8 with 10% sodium carbonate solution. The whole is stirred overnight and the reaction mixture is adjusted with 10% hydrochloric acid to pH 4 to 5. The reaction product is suction filtered and dried. 27 parts of this product is further reacted as described in Example 1. A good yield of a dye is obtained which dyes cotton brilliant yellow shades by the method described in Example 3.

I claim:

1. An azo dyestuff having the general formula:

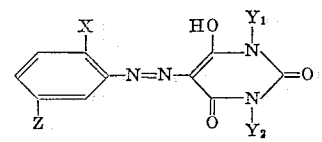

wherein X is a member selected from the group consisting of a chlorine atom and a methoxy group, $Y_1$ and $Y_2$ are members selected from the group consisting of hydrogen atoms an dmethyl groups and Z is a member selected from the group consisting of $-SO_2-NH_2$, $-SO_2-NH-CH_2-CH_2-OH$ $-SO_2-NH-CH_2-CH_2-SO_3H$ $-SO_2-NH-CH_2-COOH$ $-SO_2-NH-CH_2-CH_2-Cl$ $-SO_2-NH-CH_2-CH_2-NH_2$ $-SO_2-NH-CH_2-CH_2-CN$

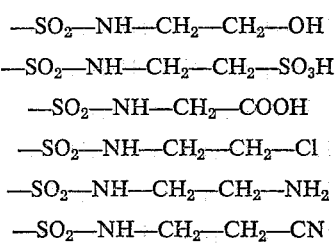

$-SO_2-NH-CH_3$ and

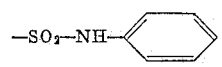

2. The dye having the formula:
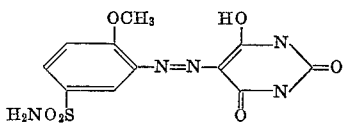
3. The dye having the formula:
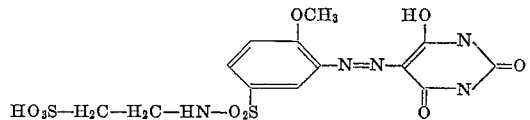
References Cited
UNITED STATES PATENTS
1,606,209  11/1926  De Montmollin et al. _ 260—146
FOREIGN PATENTS
257,797  9/1929  Great Britain.
CHARLES B. PARKER, *Primary Examiner.*
D. PAPUGA, *Assistant Examiner.*

UNITED STATES PATENT OFFICE
CERTIFICATE OF CORRECTION

Patent No. 3,352,846                      November 14, 1967

Gerhard Luetzel

It is certified that error appears in the above identified patent and that said Letters Patent are hereby corrected as shown below:

Column 5, lines 3 to 6 and 8 to 12, the right-hand portion of each formula should appear as shown below:

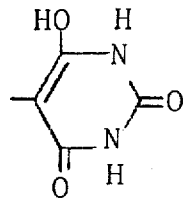

Signed and sealed this 16th day of December 1969.

(SEAL)
Attest:

Edward M. Fletcher, Jr.                      WILLIAM E. SCHUYLER, JR.
Attesting Officer                             Commissioner of Patents